United States Patent
Ota et al.

(10) Patent No.: US 11,893,723 B2
(45) Date of Patent: Feb. 6, 2024

(54) INSPECTION RESULT DISPLAY DEVICE AND STORAGE MEDIUM

(71) Applicant: SINTOKOGIO, LTD., Nagoya (JP)

(72) Inventors: Kazuhiro Ota, Toyokawa (JP); Takeshi Sonohara, Toyokawa (JP); Hiroki Matsuoka, Toyokawa (JP); Takehiro Sugino, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 312 days.

(21) Appl. No.: 17/213,377

(22) Filed: Mar. 26, 2021

(65) Prior Publication Data

US 2021/0304393 A1    Sep. 30, 2021

(30) Foreign Application Priority Data

Mar. 30, 2020  (JP) ................................ 2020-061040
Feb. 16, 2021  (JP) ................................ 2021-022451

(51) Int. Cl.
*G06V 10/764* (2022.01)
*G06T 7/00* (2017.01)
(Continued)

(52) U.S. Cl.
CPC .............. *G06T 7/0004* (2013.01); *G06F 3/14* (2013.01); *G06F 18/2431* (2023.01);
(Continued)

(58) Field of Classification Search
CPC ......... G06T 2207/30116; G06T 7/0004; G06T 7/00; G06V 10/751
See application file for complete search history.

(56) References Cited

U.S. PATENT DOCUMENTS

| 4,409,718 A | 10/1983 | Pryor |
| 5,075,051 A | 12/1991 | Ito et al. |

(Continued)

FOREIGN PATENT DOCUMENTS

| CN | 105452806 A | | 3/2016 |
| CN | 111161224 A | * | 5/2020 |

(Continued)

OTHER PUBLICATIONS

U.S. Office Action for corresponding U.S. Appl. No. 17/213,383 dated Sep. 1, 2022.
(Continued)

*Primary Examiner* — Guillermo M Rivera-Martinez
(74) *Attorney, Agent, or Firm* — Harness, Dickey & Pierce, P.L.C.

(57) ABSTRACT

Provided is a technique that allows an operator or the like to easily perceive a tendency of defects which are present in molds or patterns. A display device displays a result of inspection of a plurality of molds or a plurality of patterns which are inspection target objects. The display device classifies the inspection target objects into a plurality of groups, generates, for each of the plurality of groups, a heat map image from a result of defect inspection of one or more of inspection target objects which are classified into the each of the plurality of groups, the heat map image representing a spatial distribution of defect occurrence frequencies; and causes a display to display one or more of the heat map images generated, the one or more heat map images corresponding to one or more groups specified by a user from among the plurality of groups.

12 Claims, 8 Drawing Sheets

| Pattern code | Reference image folder No. |
|---|---|
| ... | ... |
| 10 | S10 |
| 11 | S11 |
| ... | ... |
| ... | ... |

(51) Int. Cl.
*G06F 3/14* (2006.01)
*G06T 11/00* (2006.01)
*G06F 18/2431* (2023.01)
*G06V 10/75* (2022.01)
*G06V 20/52* (2022.01)

(52) U.S. Cl.
CPC .......... *G06T 11/001* (2013.01); *G06V 10/751* (2022.01); *G06V 10/764* (2022.01); *G06V 20/52* (2022.01); *G06T 2207/30116* (2013.01)

(56) References Cited

U.S. PATENT DOCUMENTS

| | | | |
|---|---|---|---|
| 5,697,424 | A | 12/1997 | Ferdinandsen et al. |
| 6,615,159 | B1 | 9/2003 | Nishida |
| 6,661,507 | B2 * | 12/2003 | Yoda .................... G01N 21/956 356/394 |
| 2005/0225753 | A1 | 10/2005 | Engelbart et al. |
| 2007/0204555 | A1 | 9/2007 | Engelbart et al. |
| 2014/0336806 | A1 | 11/2014 | Bewlay et al. |
| 2016/0041092 | A1 * | 2/2016 | Urano ............. G01N 21/95623 356/237.5 |
| 2016/0252619 | A1 | 9/2016 | Markendorf et al. |
| 2016/0346979 | A1 | 12/2016 | Uchiyama |
| 2017/0014945 | A1 | 1/2017 | Fraser et al. |
| 2017/0165891 | A1 | 6/2017 | Shiraishi |
| 2018/0207716 | A1 | 7/2018 | Larsen et al. |
| 2019/0247917 | A1 | 8/2019 | Nishida et al. |
| 2019/0258225 | A1 * | 8/2019 | Link ................. G05B 19/4097 |
| 2019/0385116 | A1 | 12/2019 | Vosshenrich |
| 2020/0234419 | A1 | 7/2020 | Ota et al. |
| 2021/0001399 | A1 * | 1/2021 | Bullied .................... B22C 9/04 |

FOREIGN PATENT DOCUMENTS

| | | | |
|---|---|---|---|
| CN | 111929309 | A | 11/2020 |
| DE | 19542640 | A1 | 5/1996 |
| DE | 102006009320 | A1 | 9/2007 |
| DE | 202019004266 | U1 | 11/2019 |
| EP | 3315281 | A1 | 5/2018 |
| EP | 3632650 | A1 | 4/2020 |
| EP | 3736064 | A1 | 11/2020 |
| JP | H05169244 | A | 7/1993 |
| JP | H09311031 | | 12/1997 |
| JP | 2000-131242 | A | 5/2000 |
| JP | 2000131242 | A * | 5/2000 |
| JP | 2004-144556 | A | 5/2004 |
| JP | 2004198436 | A * | 7/2004 |
| JP | 2004-334631 | A | 11/2004 |
| JP | 2007-532910 | A | 11/2007 |
| JP | 2010-139461 | A | 6/2010 |
| JP | 2010-223810 | A | 10/2010 |
| JP | 2012-045563 | A | 3/2012 |
| JP | 2012045563 | A * | 3/2012 |
| JP | 2013-43185 | A | 3/2013 |
| JP | 2018-040767 | A | 3/2018 |
| JP | 2018/075830 | A | 5/2018 |
| JP | 2018-520009 | A | 7/2018 |
| JP | 2019-148497 | A | 9/2019 |
| JP | 2019-196964 | A | 11/2019 |
| JP | 2019-215932 | A | 12/2019 |
| JP | 2019-217506 | A | 12/2019 |
| JP | 2020-508275 | A | 3/2020 |
| KR | 100933697 | B1 | 12/2009 |
| KR | 2010-0124653 | A | 11/2010 |
| KR | 2090103 | B1 | 3/2020 |
| WO | WO-2017/085765 | A1 | 5/2017 |
| WO | WO-2018/216495 | A1 | 11/2018 |
| WO | WO-2020/003888 | A1 | 1/2020 |

OTHER PUBLICATIONS

Japanese Office Action and English translation thereof for JP2020-061041 dated Feb. 7, 2023.
Japanese Office Action and English translation thereof for JP2020-061043 dated Feb. 7, 2023.
U.S. Office Action for corresponding U.S. Appl. No. 17/213,383 dated Feb. 2, 2023.
U.S. Office Action for corresponding U.S. Appl. No. 17/213,361 dated Apr. 12, 2023.
U.S. Office Action for corresponding U.S. Appl. No. 17/213,381 dated Apr. 11, 2023.
Japanese Office Action and English machine translation thereof for Japanese Application No. 2020-061041 dated May 9, 2023.
Japanese Office Action and English translation thereof for Japanese Application No. 2020-061043 dated Jul. 4, 2023.

* cited by examiner

| Mold ID | Pattern code | Date and time of inspection | Inspection result | |
|---|---|---|---|---|
| | | | Evaluation | Inspection result image folder No. |
| 1001 | 10 | 2019.12.01 10:30:00 | Good | K1 |
| 1002 | 11 | 2019.12.01 10:30:30 | Good | K2 |
| 1003 | 10 | 2019.12.01 10:31:00 | Good | K3 |
| 1004 | 11 | 2019.12.01 10:31:30 | No good | K4 |
| ... | ... | ... | ... | ... |
| ... | ... | ... | ... | ... |

| Mold ID | Pattern code | Position | Mold inspection result | | ... |
| --- | --- | --- | --- | --- | --- |
| | | | Evaluation | Pouring permission/non-permission | ... |
| 1001 | 10 | P19 | Good | Permitted | ... |
| 1002 | 11 | P18 | Good | Permitted | ... |
| 1003 | 10 | P17 | Good | Permitted | ... |
| 1004 | 11 | P16 | No good | Not permitted | ... |
| ... | ... | ... | ... | ... | ... |
| ... | ... | ... | ... | ... | ... |

FIG. 14

| | G51 |
|---|---|
| | Days |
| 0 | Weeks |
| 1 | Months |
| 2 | Years |
| 3 | 2 |

INSPECTION RESULT DISPLAY DEVICE AND STORAGE MEDIUM

This Nonprovisional application claims priority under U.S.C. § 119 on Patent Application No. 2020-061040 filed in Japan on Mar. 30, 2020 and Patent Application No. 2021-022451 filed in Japan on Feb. 16, 2021, the entire contents of which are hereby incorporated by reference.

TECHNICAL FIELD

The present invention relates to an inspection result display device and a storage medium.

BACKGROUND ART

Proposed is a technique for inspecting a defect in a casting in a casting process. For example, Patent Literature 1 describes, for a case component which is produced by machining a rough shape material, (i) generating a map in which a surface of the case component is divided into a plurality of areas, and (ii) generating an image (defect image) which shows defect occurrence frequencies of the rough shape material on the map. Further, Patent Literature 1 describes displaying the areas such that each of the areas is color-coded in accordance with a defect occurrence frequency (the number of incidences of defects).

Meanwhile, Patent Literature 2 describes a device which, in an inspection operation of a production process, (i) statistically aggregates failure data including locations of parts where failures are present, contents of the failures, and the like, and (ii) then visually outputs an analysis result including a distribution of failure occurrence frequencies, the contents of the failures, and the like for each component, on an image created from an actual object which is inspected.

CITATION LIST

Patent Literature

[Patent Literature 1]
Japanese Patent Application Publication Tokukai No. 2012-45563
[Patent Literature 2]
Japanese Patent Application Publication Tokukai No. 2000-131242

SUMMARY OF INVENTION

Technical Problem

With the technique described in Patent Literature 1, when a defect of a rough shape material is found in an inspection after machining, it is possible to feed back the defect to the step of forming the rough shape material. However, it has not been possible for an operator or the like to perceive a tendency of defects which are present in molds or patterns for producing the molds. The defects which occur in the molds or the patterns vary depending on a pattern type or a molding condition. It is preferred that the operator or the like can perceive a tendency of such defects.

An object of an aspect of the present invention is to provide a technique which allows an operator or the like to easily perceive a tendency of defects which are present in molds or patterns.

Solution to Problem

In order to solve the above problem, an inspection result display device in accordance with an aspect of the present invention is an inspection result display device of which inspection target objects are a plurality of molds or a plurality of patterns, the inspection result display device including a controller. The controller carries out the step of classifying the inspection target objects into a plurality of groups. The controller also carries out the step of generating, for each of the plurality of groups, a heat map image from a result of defect inspection of one or more of inspection target objects which are classified into the each of the plurality of groups, the heat map image representing a spatial distribution of defect occurrence frequencies. The controller also carries out the step of causing a display to display one or more of the heat map images generated in the step of generating, the one or more heat map images corresponding to one or more groups specified by a user from among the plurality of groups.

Further, in order to solve the above problem, a computer-readable non-transitory storage medium in accordance with an aspect of the present invention stores a control program for controlling the inspection result display device described above, the control program causing the controller to carry out each of the foregoing steps.

Advantageous Effects of Invention

An aspect of the present invention allows a user to easily perceive a tendency of defects which are present in molds or patterns.

BRIEF DESCRIPTION OF DRAWINGS

FIG. 14 is a diagram illustrating an example of a screen for selecting a period.

DESCRIPTION OF EMBODIMENTS

Embodiment 1

Figure 1:
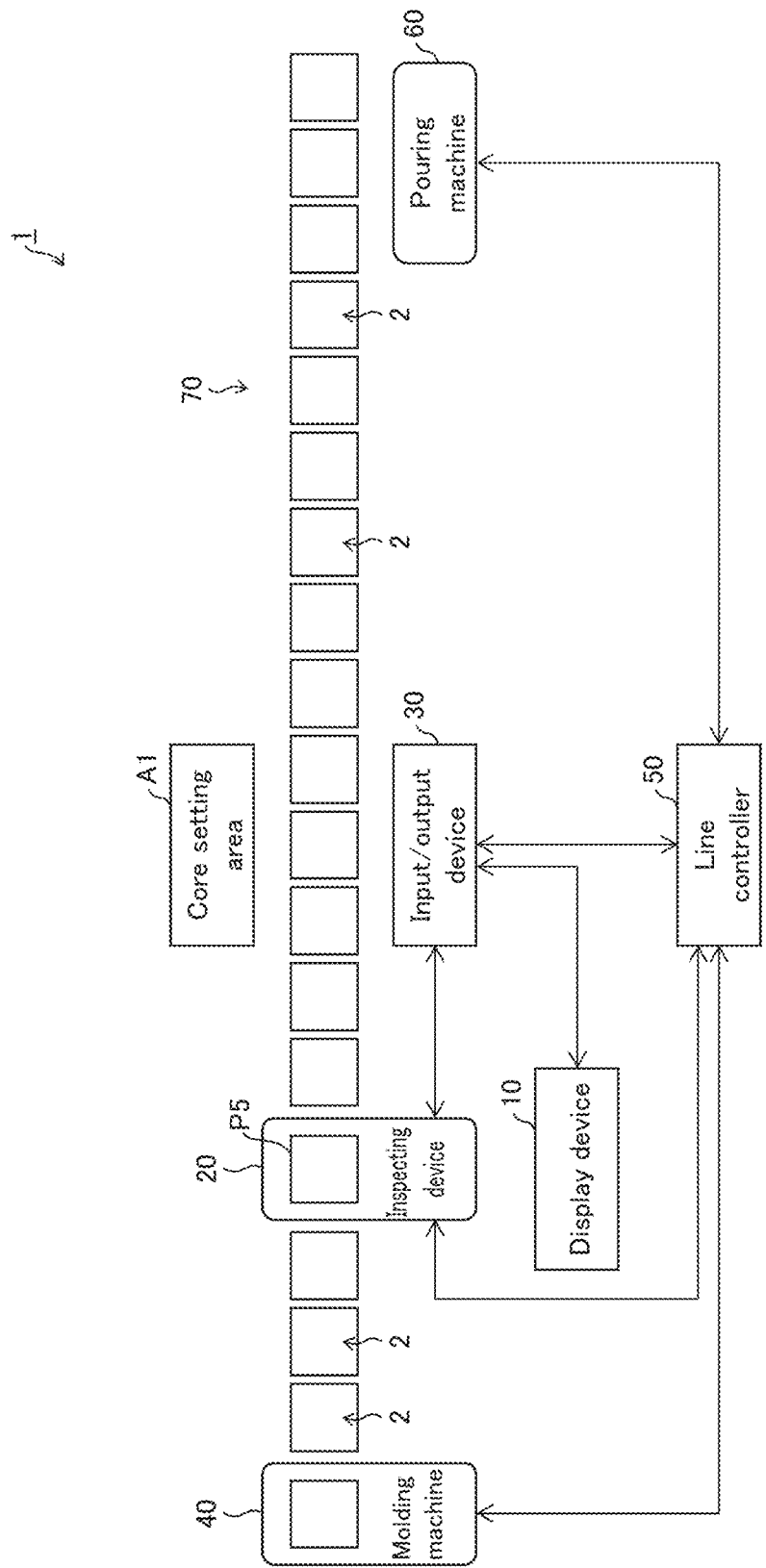
FIG. 1 is a diagram schematically illustrating a casting system in accordance with Embodiment 1 of the present invention.

FIG. 1 is a diagram schematically illustrating a configuration of a casting system 1 that includes a display device 10 in accordance with an embodiment of the present invention. The casting system 1 is a part of a system that produces castings by pouring molten metal into a plurality of molds 2 conveyed along a conveyance path. The casting system 1 includes a display device 10, an inspecting device 20, an input/output device 30, a molding machine 40, a line controller 50, a pouring machine 60, and a conveying device 70.

The display device 10 (an example of an inspection result display device and a controller) illustrated in FIG. 1 causes a display to display a result of defect inspection of an inspection target object. In Embodiment 1, the inspection target object is a product surface (cavity surface) of each of the plurality of molds 2. The product surface of each of the molds 2 may have a defect such as mold drop of a mold 2 or sand adhesion to a mold 2. The mold drop refers to a state in which a portion of the mold 2 is missing. On the other hand, the sand adhesion refers to a state in which sand adheres to a portion of the mold 2. The result of the defect inspection includes, for example, a position, a size, and a shape of the mold drop of the mold 2 or a position, a size, and a shape of the sand adhesion to the mold 2. Embodiment 1 discusses a case where a result of inspection for mold drop is displayed. The display device 10 is, for example, a laptop or desktop personal computer. The display device 10 may be a smart phone carried by a user such as an operator or a tablet terminal carried by the user.

The inspecting device 20 captures respective images of the plurality of molds 2 which are conveyed along the conveyance path. The inspecting device 20 includes, for example, a camera. The inspecting device 20 identifies a defect of a mold 2, by use of image data containing the mold 2 as a subject.

The input/output device 30 is a device for a user to carry out various operations. The input/output device 30 includes an operating section (not illustrated) which is operated by the user and a display 31 on which the inspection result of the mold 2 is displayed (see FIG. 2). The input/output device 30 is installed in a place corresponding to a step which is provided downstream of a place where image capture is carried out by the inspecting device 20. In the example illustrated in FIG. 1, the input/output device 30 is installed in a core setting area A1.

The display 31 is, for example, a liquid crystal display, and displays an image on a screen in accordance with data supplied from the display device 10. In Embodiment 1, the display 31 displays the result of the defect inspection of the mold 2 in accordance with data supplied from the display device 10. Note that the display 31 may be provided in a device other than the input/output device 30. The display device 10 may be configured to include the display 31.

The molding machine 40 is a device that produces molds 2 with use of a pattern. The molding machine 40 receives information on a mold 2 (hereinafter referred to as "mold information") from the line controller 50, and produces a mold 2 which is indicated by a pattern code included in the received mold information. The pattern code is information that uniquely represents a molding pattern. The molding machine 40 charges sand into a molding flask (not illustrated) which is set together with a pattern (not illustrated), and compacts the sand by pressing the sand in the molding flask. The molding machine 40 forms a mold 2 by removing the pattern from the compacted sand.

The line controller 50 is a controller that carries out overall control of the casting system 1. In this embodiment, the line controller 50 controls, in particular, the molding machine 40, the pouring machine 60, and the conveying device 70. The pouring machine 60 is a device that pours molten metal into a mold 2. The pouring machine 60 pours molten metal (carries out pouring) into a mold 2, as a pouring target, located in a pouring area, in accordance with a control signal transmitted from the line controller 50.

The conveying device 70 is a device that carries molds 2 from the molding machine 40 to the front of the pouring machine 60. The conveying device 70 has, for example, a roller conveyor (not illustrated) or a rail (not illustrated) to sequentially convey a plurality of molds 2 along a conveyance path on the roller conveyor or the rail. The conveying device 70 carries each of the molds 2 in accordance with a control signal transmitted from the line controller 50.

The core setting area A1 is provided between the inspecting device 20 and the pouring machine 60. In the core setting area A1, an operator is present to set cores in molds 2.

Figures 2, 3:
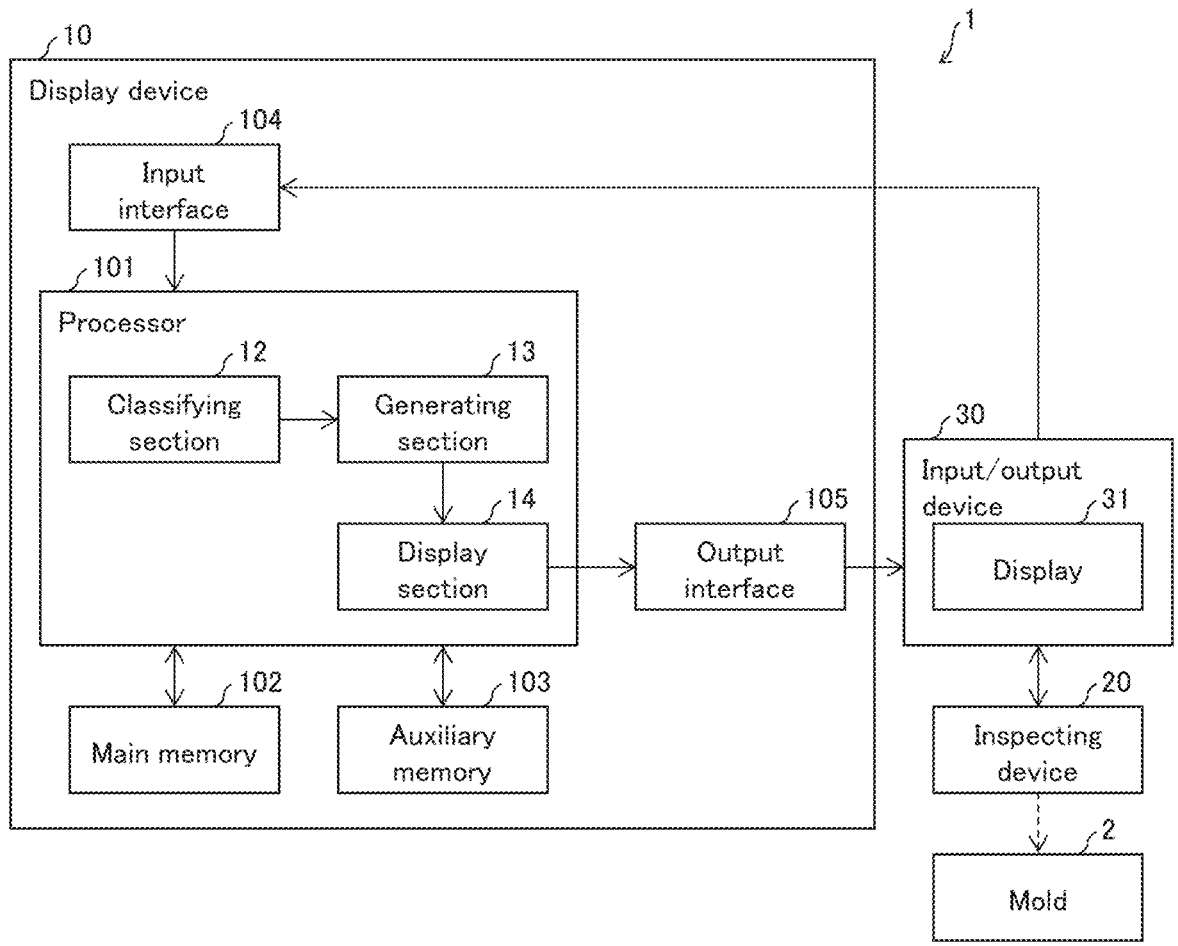
FIG. 2 is a block diagram schematically illustrating a display device in accordance with Embodiment 1 of the present invention.
FIG. 3 is a diagram illustrating an example of contents of a reference image table.

FIG. 2 is a block diagram schematically illustrating a configuration of the display device 10. The display device 10 includes a processor 101, a main memory 102, an auxiliary memory 103, an input interface 104, and an output interface 105, as illustrated in FIG. 2. The processor 101 is a processor that controls the display device 10, and is, for example, a processor such as a microprocessor, a digital signal processor, a microcontroller, or any combination of these processors. The main memory 102 is, for example, a semiconductor random access memory (RAM). The auxiliary memory 103 is, for example, a flush memory, a hard disk drive (HDD), a solid state drive (SSD), or any combination of these memories. The auxiliary memory 103 stores a program for causing the processor 101 to execute an operation of the display device 10. The processor 101 causes a control program stored in the auxiliary memory 103 to be loaded in the main memory 102 and executes instructions contained in the loaded control program. The auxiliary memory 103 is an example of a memory in accordance with an embodiment of the present invention.

The auxiliary memory of the inspecting device 20 stores a reference image table and an inspection result table. The reference image table is a table that stores, on a pattern by pattern basis, a reference image to be used when an inspection of the molds 2 is carried out. The inspection result table is a table that stores a result of defect inspection of each of the molds 2 in association with identification information that identifies each of the molds 2.

FIG. 3 is a diagram illustrating an example of contents of the reference image table. In the example illustrated in FIG. 3, the reference image table stores items of "pattern code" and "reference image folder No." in association with each other. Of these items, the item "pattern code" stores identification information (ID) that identifies a pattern. The item "reference image folder No." stores information indicative of a storage location of data of a reference image corresponding to that pattern. Note that the items contained in the reference image table are not limited to those described above, and other items may be contained in the reference image table.

Figures 4, 5:
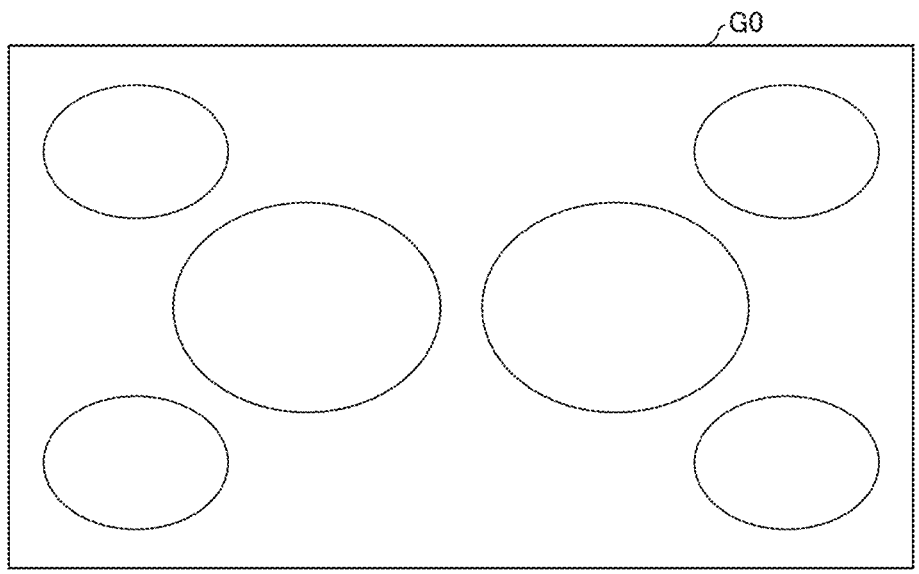
FIG. 4 is a diagram illustrating an example of a reference image.
FIG. 5 is a diagram illustrating an example of contents of an inspection result table.

FIG. 4 is a diagram illustrating an example of a reference image G0. In the example of FIG. 4, the reference image G0 is an image captured of a defect-free mold 2 by the inspecting device 20.

FIG. 5 is a diagram illustrating an example of contents of the inspection result table. In the example illustrated in FIG. 5, the inspection result table stores the items of "mold ID", "pattern code", "date and time of inspection", and "inspection result" in association with each other. Of these items, the item "mold ID" stores identification information that identifies a mold 2. The item "pattern code" stores identification information (pattern code) that identifies a pattern. The item "date and time of inspection" stores information that indicates the date and time when a defect inspection was carried out. The item "inspection result" stores information that indicates a result of defect inspection.

The item "inspection result" includes items of "evaluation" and "inspection image folder No". The item "evaluation" stores information that indicates an evaluation result of the defect inspection. The information indicating the evaluation result is, for example, "GOOD", "NO GOOD", or "FAIL". "GOOD" indicates that the mold 2 is normal. "NO GOOD" indicates that the mold 2 is abnormal (has a defect). "FAIL" indicates that the inspection itself failed. The item "inspection image folder No." stores information that indicates a storage location of an image (hereinafter referred to as "inspection image") representing the result of the defect inspection of the mold 2. Note that the items contained in the inspection result table are not limited to those described above, and other items may be contained in the inspection result table.

The following description refers back to FIG. 2. The input interface 104 obtains, from the inspecting device 20, data representing an inspection result. The output interface 105 outputs, to the display 31, data representing an image. Although one input interface 104 and one output interface 105 are illustrated in FIG. 1, the display device 10 may include a plurality of input interfaces and/or a plurality of output interfaces. In this example, the processor 101 reads and executes the control program stored in the auxiliary memory 103, thereby realizing a classifying section 12, a generating section 13, and a display section 14.

In Embodiment 1, the defect inspection of the molds 2 is carried out by the inspecting device 20. The inspecting device 20 carries out the defect inspection of the plurality of molds 2 which are conveyed on the conveyance path, by using an image which is captured by the inspecting device and a reference image which is registered in the reference image table. The inspecting device 20 carries out a process of identifying a defective portion, for example, by (i) first generating a difference image representing a difference between an image which is captured by the inspecting device 20 and a reference image which has been registered in advance, and (ii) then detecting a blob in the difference image by particle analysis of the difference image which has been generated.

The inspecting device 20 stores, in the inspection result table, data representing an inspection result (hereinafter, referred to as "inspection result data") associated with identification information of the molds 2. Each of the plurality of molds 2 undergoes the defect inspection, so that inspection results of the plurality of molds 2 are accumulated in the inspection result table.

The classifying section 12 classifies the plurality of molds 2 into a plurality of groups. The generating section 13 generates, for each of the plurality of groups, a heat map image representing a spatial distribution of defect occurrence frequencies, from results of defect inspection of molds 2 which are classified into the each of the plurality of groups. In Embodiment 1, the generating section 13 displays a position, a size, and a shape of mold drop in a heat map format. The generating section 13 stores, in the auxiliary memory 103, data representing the heat map image thus generated.

The display section 14 causes the display 31 to display one or more heat map images corresponding to one or more groups specified by a user, among heat map images generated by the generating section 13.

The line controller 50 has a mold management table for managing mold information. The mold management table is stored in, for example, an auxiliary memory of the line controller 50. The mold information is information on a mold 2 and includes, for example, identification information that identifies the mold 2 and position information that indicates a position of the mold 2 on the conveyance path. That is, the mold management table stores the identification information of the mold 2 in association with the position information of the mold 2.

Figures 6, 7:
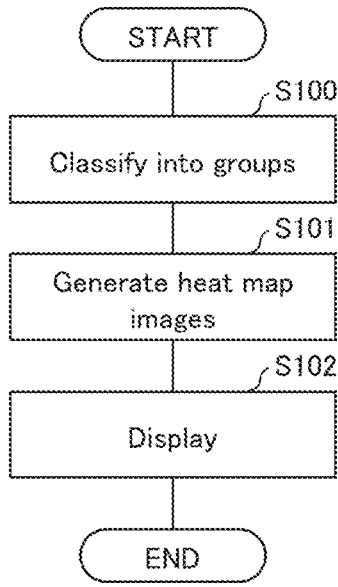
FIG. 6 is a diagram illustrating an example of contents of a mold management table.
FIG. 7 is a flowchart showing an example of a flow of an inspection result display process by the display device in accordance with Embodiment 1 of the present invention.

FIG. 6 is a diagram illustrating an example of contents of the mold management table. The mold management table stores items such as "mold ID", "pattern code", "position", and "mold inspection result" which are associated with each other. Of these items, the item "mold ID" stores identification information that identifies a mold 2. The item "pattern code" stores identification information (pattern code) that identifies a pattern which is used to produce a mold 2 identified by the corresponding mold ID.

The item "position" stores information indicating the position of the mold 2, which is identified by the corresponding mold ID, on the conveyance path (hereinafter referred to as "position information"). In this embodiment, positions P1 to P19 are set as the position of the mold 2 on the conveyance path. The position P1 is located most upstream in a conveyance direction of the conveying device 70 and is followed by the position P2, the position P3, and the like position information, which are assigned to positions downstream of the position P1. The position P1 is a position at which mold formation is carried out by the molding machine 40. The positions P2 to P4 are positions between the molding machine 40 and the inspecting device 20. The position P5 is a position at which image capture is carried out by the inspecting device 20. The positions P6 to P17 are positions between the inspecting device 20 and the pouring machine 60. The position P9 is a position in front of the display 31. The position P18 is a position at which pouring of molten metal is carried out by the pouring machine 60. The position P19 is a position at which the molding flask containing the mold 2 into which the molten metal has been poured is taken out.

The conveying device 70 sequentially moves a plurality of molds 2 on the conveyance path, and outputs, each time the molds 2 are moved, a signal indicating that the movement is completed (hereinafter referred to as a "flask feed completion signal"). Each time a plurality of molds 2 are moved on the conveyance path, the line controller 50 updates the position information which is associated with the identification information of each of the molds 2. In this embodiment, each time the flask feed completion signal is received from the conveying device 70, the "position information" included in the mold information, which is stored in the mold management table, is incremented by one, and new mold information is added to the mold management table. The position information indicating the position P1 is stored in "position" of the added mold information. Note that, when the molding flask at the position P19 is fed, it means that the molding flask will be taken out of the casting system 1.

The item "mold inspection result" includes items of "evaluation" and "pouring permission/non-permission". The item "evaluation" stores information that indicates an evaluation result of a defect inspection. The information stored in the item "evaluation" is the same as the information stored in the item "evaluation" in the inspection result table of the display device 10.

The item "pouring permission/non-permission" stores information that indicates whether or not pouring is to be carried out (hereinafter referred to as "pouring permission/non-permission information"). In Embodiment 1, an operator who sets cores makes a judgment as to whether or not to permit pouring into the mold 2, by visually checking an inspection result displayed on the display 31 and an actual mold. Then, the operator enters a result of the judgment by means of the input/output device 30. The input/output device 30 transmits the pouring permission/non-permission information to the line controller 50 in response to the operation of the operator. The line controller 50 causes the pouring permission/non-permission information received from the input/output device 30 to be stored in the item "pouring permission/non-permission" of the mold management table. Note that the items contained in the mold management table are not limited to those described above, and other items may be contained in the mold management table.

(Operations)

FIG. 7 is a flowchart showing an example of a flow of an inspection result display process by the display device 10. Note that some of steps may be carried out in parallel to each other or in a different order.

In step S100, the classifying section 12 classifies a plurality of molds 2 into a plurality of groups. In Embodiment 1, the classifying section 12 classifies each of the plurality of molds 2, by a pattern used in forming the each mold. More specifically, the classifying section 12 classifies the molds 2, by pattern codes associated with mold IDs of the molds 2, respectively, in the inspection result table of the inspecting device 20.

In step S101, the generating section 13 refers to inspection results stored in the inspection result table, via the input/output device 30. Then, the generating section 13 generates, for each of the plurality of groups, a heat map image representing a spatial distribution of defect occurrence frequencies from results of defect inspection of inspection target objects classified into the each group. The generating section 13, for example, aggregates, for each of a plurality of patterns, defect occurrence frequencies for each unit area (e.g., for each pixel) in a reference image corresponding to the each pattern. Then, the generating section 13 generates a heat map image representing, in the heat map format, defect occurrence frequencies for each unit area which defect occurrence frequencies are indicated in an aggregation result. For example, the display device 10 carries out aggregation processing by assigning, to each pixel included in an inspection image, "1" in a case where there is a defect and "0" in a case where there is no defect, and calculating a total value for each pixel in a plurality of inspection images. The display device 10 generates a heat map image in which each pixel is color-coded in accordance with the total value thus calculated. The display device 10 may generate, as the heat map image, an image representing a spatial distribution of defect occurrence frequencies (hereinafter referred to as "spatial distribution image"). Alternatively, the display device 10 may generate, as the heat map image, an image in which the spatial distribution image is superimposed on the reference image or the inspection image.

As described above, information indicating the inspection result is accumulated in the display device 10 for each position corresponding to mold drop, and the information thus accumulated is displayed as the heat map image. At this time, for example, in a case where the defect occurrence frequencies are color-coded by colors which are represented in RGB space, the color for the highest occurrence frequency range is set to (r, g, b)=(255, 0, 0) whereas the color for the lowest occurrence frequency range is set to (r, g, b)=(0, 0, 255). Then, the generating section 13 may assign, to respective ranges of the defect occurrence frequencies, colors in a color gradient between the above two colors. The display device 10 may similarly cause a color-coded display to be displayed as a heat map image in accordance with occurrence frequencies of sand adhesion in a case where an inspection result of sand adhesion is to be displayed.

Figure 8:
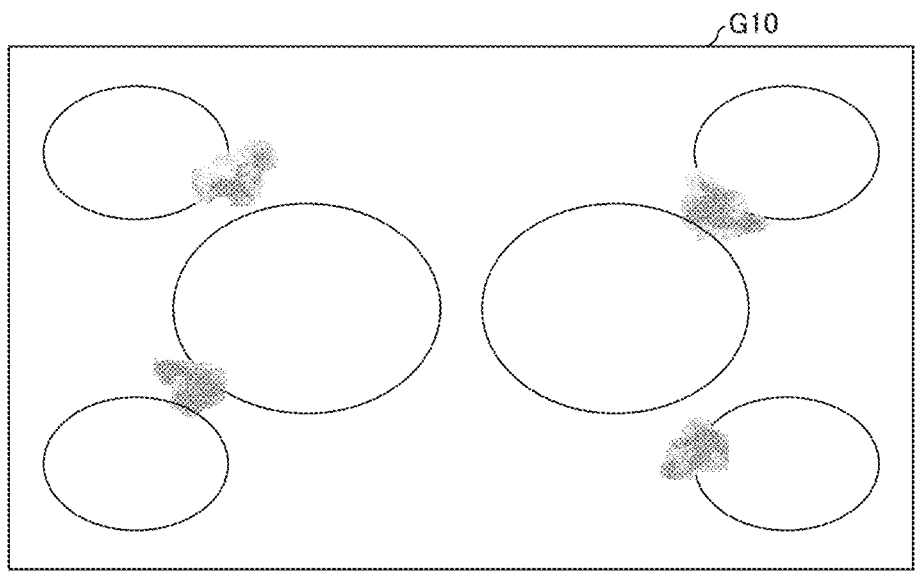
FIG. 8 is a diagram illustrating an example of a heat map image.
Figure 9:
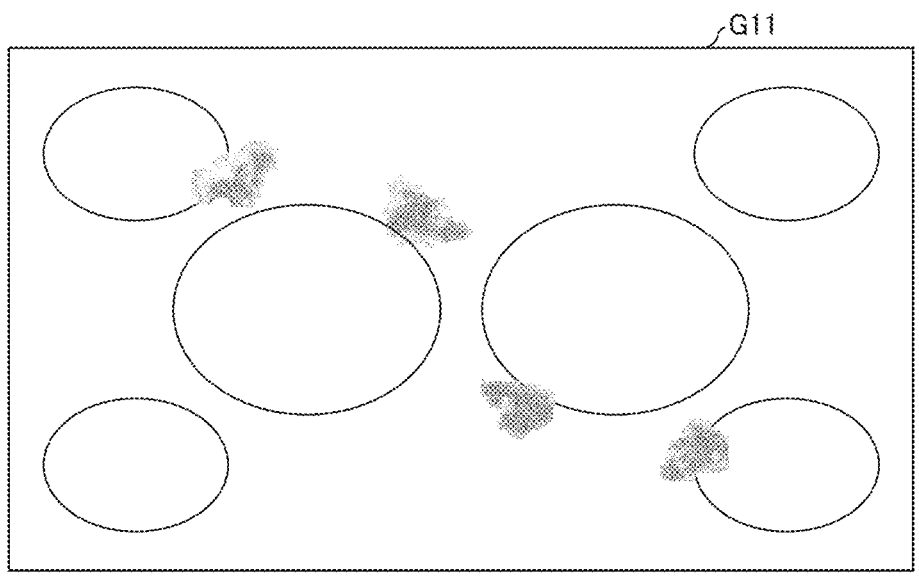
FIG. 9 is a diagram illustrating an example of a heat map image.

FIGS. 8 and 9 are diagrams showing examples of heat map images generated by the generating section 13. In the examples of FIGS. 8 and 9, generated as the heat map image is an image in which a reference image and a spatial distribution image are superimposed on top of each other. In FIGS. 8 and 9, heat map images G10 and G11 represent, in the heat map format, results of defect occurrence frequency aggregation on a pixel by pixel basis. The generating section 13 stores, in the auxiliary memory 103, a heat map image generated for each pattern in association with a pattern code that identifies the pattern. The heat map image for each pattern is accumulated in the auxiliary memory 103.

The generating section 13, for example, divides defect occurrence frequencies into a plurality of ranges in the heat map image, and use different colors for respective ranges into which the occurrence frequencies are divided, thereby showing the defect occurrence frequencies in the heat map image. For example, in a case where the defect occurrence frequencies are color-coded by colors which are represented in RGB space, the color for the highest occurrence frequency range is set to (r, g, b)=(255, 0, 0) whereas the color for the lowest occurrence frequency range is set to (r, g, b)=(0, 0, 255). Then, the generating section 13 may assign, to respective occurrence frequency ranges, colors in a color gradient between the above two colors.

In a case where a user such as an operator wants to grasp a tendency of inspection results, the user carries out an operation to specify one or more patterns via the input/output device 30. According to the operation by the user, the input/output device 30 transmits, to the display device 10, information indicating one or more groups specified by the user (hereinafter, referred to as "specified information"). Upon receiving the specified information from the input/output device 30, the display device 10 carries out the processing of step S102 in FIG. 7.

The following description refers back to FIG. 7. In step S102, the display device 10 transmits, to the input/output device 30, the one or more heat map images corresponding to the one or more groups specified by the user, among the heat map images generated in step S101. Then, the display device 10 causes the display 31 to display the one or more heat map images. The processing of step S102 causes the heat map images shown as examples in FIGS. 8 and 9 to be displayed on the display 31.

In the above configuration, the display device 10 classifies the molds 2 into a plurality of groups, and causes the display 31 to display one or more heat map images corresponding to one or more groups specified by a user. Therefore, it is easy for the user to perceive a tendency of occurrence of defects which are present in the molds 2 (e.g., tendency of where the defects occur). This allows the user to easily analyze a cause due to which the defects of the molds 2 occurred.

[Variation 1]

The above-described embodiment dealt with a case where a mold 2 is formed with a flask. A method of forming the mold 2 is not limited to the method described in the above-described embodiment. The mold 2 may be, for example, formed by flaskless molding. In the case of flaskless molding, the molding machine 40 forms each mold by sand filling in a state in which a match plate is sandwiched between a cope flask and a drag flask. When the match plate is removed after forming the mold, a small inspecting device 20' is inserted between a cope and a drag. Then, images of product surfaces of the cope and the drag are captured. After capturing the images, the small inspecting device 20' is removed. Subsequently, after the cope and the drag are mated with each other, those flasks are removed. Then, the cope and the drag are conveyed by the conveying device 70'. While the cope and the drag are being conveyed by the conveying device 70', a jacket and a weight are mounted. Then, pouring is carried out at a pouring position. The small inspecting device 20' inspects the molds for defects by comparing a captured image with a reference image, and then accumulates an inspection result in the inspection result table.

The display device 10 refers to the inspection results accumulated in the inspection result table, via the input/output device 30. Then, for each of the plurality of groups, the display device 10 generates a heat map image from these inspection results. The step of generating the heat map image is the same as that in the above-described embodiment. In classifying a plurality of molds 2 into groups, the display device 10 may classify each of the plurality of the molds 2 by whether a mold is a cope or a drag.

In the present aspect, as in the above-described embodiment, a tendency of occurrence of defects that are present in the molds 2 can be presented to a user in a heat map image. This makes it easier for the user to analyze a cause due to which the defects of the molds 2 occurred.

[Variation 2]

The above-described embodiment dealt with a case where inspection target objects for defect inspection are a plurality of molds 2. The inspection target objects are not necessarily limited to the molds 2. The inspection target objects may be a plurality of patterns for use in forming the molds 2. In other words, the inspection target objects for defect inspection are a plurality of molds 2 or a plurality of patterns for use in forming the plurality of molds 2. In a case where the inspection target objects are patterns, defects includes, for example, sand residue in a pattern, a missing portion of a pattern, or wear of a pattern, and results of the defect inspection includes, for example, the position where sand residue in a pattern, a missing portion of a pattern, or wear of a pattern occurs.

In this case, the display device 10 classifies those inspection results of the patterns into a plurality of groups, and causes the display 31 to display one or more heat map images corresponding to one or more groups specified by a user. Therefore, it is easy for the user to perceive a tendency of defects which are present in the patterns. This allows the user to easily analyze a cause of the defects present in the patterns.

[Variation 3]

In the above-described embodiment, the inspecting device 20 carries out a process of identifying a defect of a mold 2, by use of image data containing the mold 2 as a subject. The defect may be identified by a device other than the inspecting device 20. For example, the display device 10 may carry out the process of identifying a defect of the mold 2, by use of image data containing the mold 2 as a subject.

[Variation 4]

In the above-described embodiment, there may be a case where the size of mold drop is small relative to the surface area of a mold 2. Accordingly, the display device 10 may be configured to make it possible to magnify and display a portion which a user wants to see in a magnified state. In this case, when a user carries out an operation to specify a portion included in a heat map image being displayed on the display 31, the display device 10 may cause that specified portion of the heat map image to be magnified and displayed.

[Variation 5]

In the above-described embodiment, there may be a case where, when molds are inverted or flasks are fed, sand, which is adhered to the boundary between a mold and an outer periphery portion of a metal flask corresponding to a product surface of the mold, falls on the product surface of the mold. In such a case, when the cope and the drag are mated with each other, the sand having fallen on the mold 2 may be present between the cope and the drag and may cause a failure. Therefore, the display device 10 may detect sand having fallen on the surface of the mold 2 as a defect.

Embodiment 2

The following will discuss another embodiment. Embodiment 2 differs from Embodiment 1 in the content of a classification step which is carried out by a classifying section 12. In Embodiment 2, in the classification step, a display device 10 classifies each of a plurality of molds 2 into a plurality of groups by at least one of (a) a pattern type; (b) a molding condition associated with formation of the mold 2 and (c) a result of defect inspection. The molding condition includes at least one of, for example, (a) a period in which the mold 2 is inspected, (b) a sand property of the mold 2, (c) a control parameter of a molding machine 40, and (d) a meteorological condition. The result of the defect inspection includes, for example, the degree of defect severity. The sand property of the molds 2 includes, for example, compactability (CB value), moisture, air permeability, compressive strength, and sand temperature. Further, the molding condition may include whether or not a defect of the mold 2 affects the product quality of a casting.

The control parameter refers to a parameter that affects the product quality of the molds 2. Major examples of the control parameter include the following:

aeration air pressure for filling a molding flask with sand
air pressure in a sand tank
difference between aeration air pressure and air pressure in a sand tank
squeeze pressure
operating pressure of a cylinder for a leveling frame
operating time of a cylinder for a segment squeeze foot
downward pressure of a cylinder for a segment squeeze foot The meteorological condition includes, for example, temperature and/or humidity.

The degree of defect severity is referred to when whether to permit pouring is determined. In a case where the degree of defect severity is high, pouring is controlled so as not to be carried out. In contrast, in a case where the degree of defect severity is low, for example, the defect can be recovered, for example, by grinding a defective part by a grinder, so that pouring can be permitted. The degree of defect severity is judged, for example, by an operator who sets cores. The operator then manually enters a result of such a judgment. The degree of severity differs depending on (a) a position where the defect occurs (for example, the degree of severity is high when the defect occurs in the vicinity of a recess/projection of a pattern) and/or (b) a size of the defect.

The molding condition of the mold 2 is contained in mold information which is stored in, for example, a mold management table. That is, the mold management table stores the molding condition of the mold 2 in association with identification information that identifies the mold 2. Further, as described above, date and time information indicating the date and time when the mold 2 is inspected is stored in an inspection result table.

Example Operation 1

A user carries out an operation to select a group(s) corresponding to a molding condition(s), via an input/output device 30. In response to the operation by the user, the input/output device 30 causes the display 31 to display a screen for selecting a group(s) corresponding to the molding condition(s).

Figure 10:
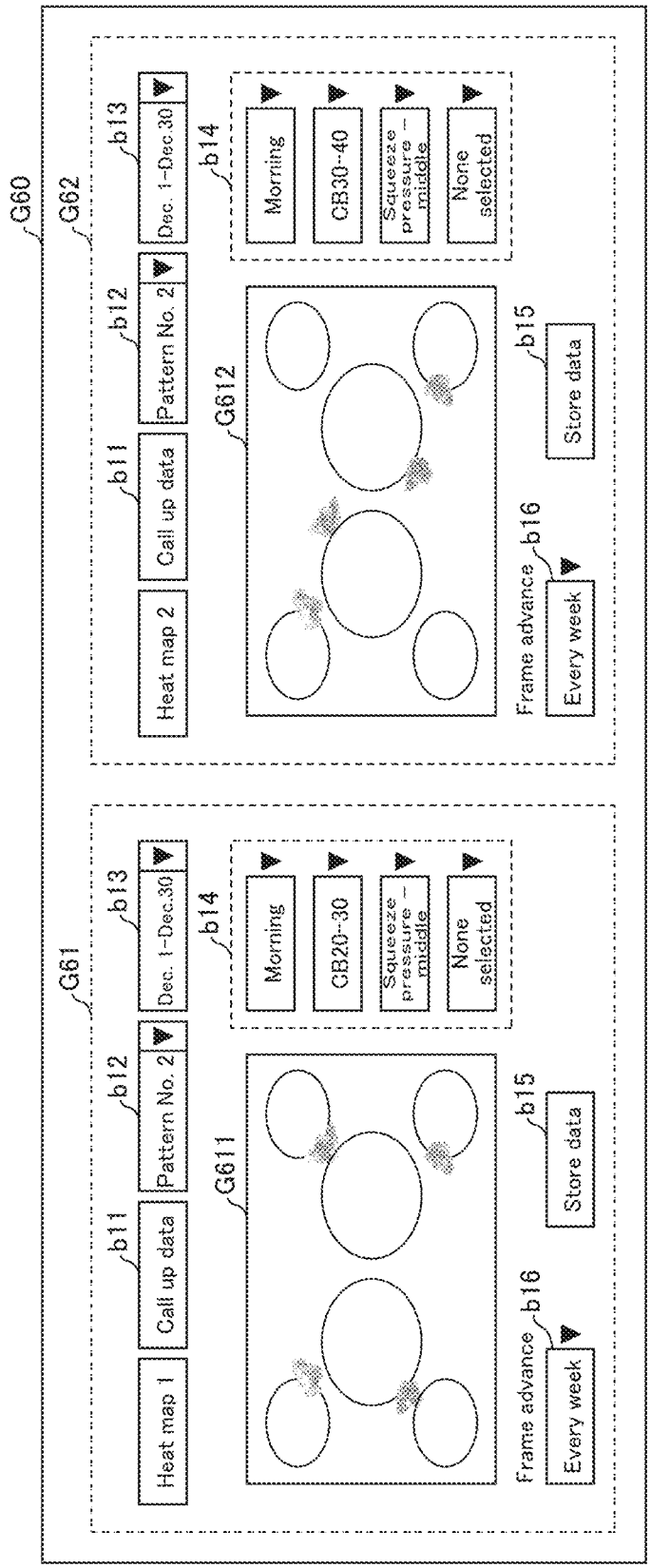
FIG. 10 is a diagram illustrating an example of a display screen of heat map images.

FIG. 10 is a diagram illustrating an example of a display screen of a heat map image. A screen G60 includes display regions G61 and G62. The display regions G61 and G62 display heat map images G611 and G612, respectively. The display regions G61 and G62 each display elements b11 to b16. The display element b11 is a button for reading out data of a heat map image stored in an auxiliary memory 103. When a user selects the display element b11, the display device 10 reads out the data of the heat map image from the auxiliary memory 103 in response to the user's operation, and causes the display regions G61 or G62 to display the heat map image represented by the data which has been read out.

The display element b12 is a list box for selecting a pattern type (an example of the group). A user selects a pattern type, via the display element b12. The display device 10 selects one pattern type from a plurality of pattern types, in accordance with an operation to the display element b12 by the user.

The display element b13 is a button for specifying an inspection period (one example of the group) of molds 2. A user selects an inspection period of molds 2, via the display element b13. The display device 10 selects the inspection period in accordance with an operation to the display element b13 by the user.

The display element b14 is a group of list boxes for selecting one or more groups corresponding to one or more molding conditions of molds 2. A user selects one or more groups for use in generating one or more heat map images, via the display element b14. The display device 10 selects the one or more groups corresponding to the one or more molding conditions, in accordance with an operation to the display element b14 by the user. The one or more groups corresponding to the one or more molding conditions of the molds 2 include, for example, groups into which the molds 2 are classified by a period (morning, afternoon, or the like), a CB value (20 to 30, or the like), and a squeeze pressure (middle, or the like). In this way, a user selects the one or more groups for classifying the mold 2, via the display elements b12, b13, and b14 on the screen G60.

When the user selects a group, the display device 10 receives, from the input/output device 30, specified information indicative of the group selected by the user. On the basis of information which indicates a period specified by the user and which is included in the specified information received (hereinafter referred to as "period information"), the display device 10 searches, via the input/output device 30, the inspection result table for molds 2 inspected during the period indicated by the period information. The display device 10 sends, to the line controller 50, a request containing the identification information that identifies the molds 2 that have been searched for. The line controller 50 searches the mold management table for the identification information contained in the request received from the display device 10. The line controller 50 transmits, to the display device 10, a response including a molding condition(s) (CB value, etc.) of the molds 2, which molding condition(s) is/are associated with the identification information which has been searched for. The display device 10 classifies a plurality of molds 2 inspected during the period specified by the user, into a plurality of groups by the molding condition(s) included in the response which has been received from the line controller 50.

For example, if the user selects a group in which the "period" is in the "morning" and the "CB value" is "20-30", the display device 10 generates a heat map image showing a spatial distribution of defect occurrence frequencies by using inspection results of a plurality of molds 2 each having the date and time of inspection of "morning" and a CB value of 20% to 30%. The step of generating the heat map image is the same as that in the above-described Embodiment 1. The heat map image generated is displayed on the display 31, and is accumulated in the auxiliary memory 103 in response to an operation by a user. The data of the heat map image accumulated in the auxiliary memory 103 is read out at the time desired by the user, and displayed on the display 31.

As described above, the display device 10 generates image data representing one or more heat map images corresponding to one or more groups selected by a user, on the basis of the one or more groups corresponding to one or more molding conditions selected by the user. The display device 10 transmits, to the input/output device 30, the image data generated, and causes the display 31 to display the image data. The input/output device 30 receives the image data from the display device 10, and displays, on the display 31, the heat map images represented by the image data received. This causes the heat map images shown as an example in FIG. 10 to be displayed on the display 31.

In a case where the user selects a group for each of the display regions G61 and G62, the heat map image corresponding to the group selected is displayed in each of the display regions G61 and G62.

As illustrated in FIG. 10, the display device 10 displays, side by side on one screen G60, a plurality of heat map images G611 and G612 generated in accordance with molding conditions. The plurality of heat map images thus displayed are heat map images corresponding to different groups, respectively. For example, the heat map image G611 may be a heat map image of molds 2 having CB values of "37% to 43%", and the heat map image G612 may be a heat map image of molds 2 having CB values of "44% to 50%".

Note that the number of the heat map images displayed on one screen is not limited to 2, and the number may be more or less than 2. Further, the display device 10 does not necessarily display a plurality of heat map images side by side, and may cause the display 31 to display a plurality of heat map images in a superimposed manner. In a case where the plurality of heat map images are displayed in a superimposed manner, the display device 10 may cause at least a portion of the plurality of heat map images to be displayed in a translucent manner.

The display element b15 in FIG. 10 is a button for storing data of a heat map image being displayed. When the display element b15 is selected by a user, the display device 10 stores, in the auxiliary memory 103, the data of the heat map image being displayed on the display 31. The data stored in the auxiliary memory 103 can be read out, by a user selecting the display element b11.

The display element b16 is a button for carrying out frame-advance display (animation display). A user uses the display element b16 to select a unit period that indicates a period corresponding to each frame, in carrying out the frame-advance display. The unit period is a unit for classifying inspection periods of the molds 2 into a plurality of groups. Note that the user selects "None selected" in the display element b16 in a case where the frame-advance display is not to be carried out. When the user specifies a unit period for the frame-advance display by using the display element b16, the display device 10 classifies each of the plurality of the molds 2 by each unit period in which the each mold 2 was inspected. The display device 10 then generates a heat map image for each unit period specified (group by group). The display device 10 performs animation display by switching heat map images corresponding to the plurality of groups, respectively, in order.

For example, in FIG. 10, when "December 1 to December 30" is selected in the display element b13 and "every week" is selected in the display element b16, the display device 10 classifies inspection results of molds 2 inspected in a period of "December 1 to December 30" on a weekly basis. The display device 10 then generates weekly heat map images. The display device 10 performs animation display by switching the weekly heat map images in the period of "December 1 to December 30" in an ascending order or in a descending order.

As described above, the user can switch the heat map images which are to be displayed on the screen G60 from one to another, by using the display elements b11 to b16 on the screen G60.

The display elements (display elements b12, b13, b14, etc.) for selecting a group(s) for displaying a heat map image(s) are not limited to those described above, and various display elements can be employed. The following will describe other examples of a screen for selecting a group, with reference to FIGS. 11 to 13.

Example Operation 2

Figure 11:
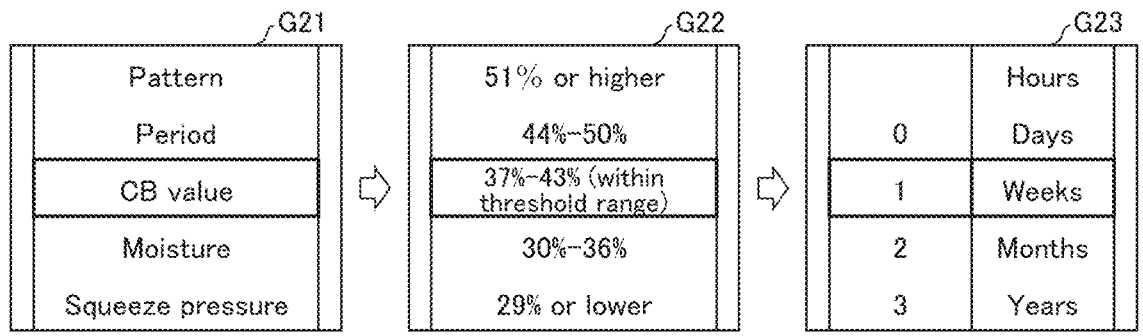
FIG. 11 is a diagram illustrating an example of screen transition for selecting a molding condition.

FIG. 11 is a diagram illustrating an example of screen transition for selecting a group corresponding to a molding condition. The input/output device 30 causes the display 31 to display a screen G21 in response to an operation by a user. The screen G21 corresponds to the display element b14 in the screen G60 of FIG. 10. The screen G21 is a screen for selecting any one of items "pattern", "period", "CB value", "moisture", and "squeeze pressure". These items are displayed on the screen G21 by scrolling. When a user selects "CB value" on the screen G21, the input/output device 30 causes transition of a display of the display 31 to a screen G22.

The screen G22 is a screen for specifying a range of the CB value (group). The screen G22 is a screen for selecting one of groups "29% or lower", "30% to 36%", "37% to 43% (within threshold range)", "44% to 50%", and "51% or higher". These groups are displayed on the screen G22 by scrolling. When a user selects "37% to 43% (within threshold range)" on the screen G22, the input/output device 30 causes transition of a display of the display 31 to a screen G23. A method of specifying the range of the CB value is not limited to the method using the screen G22. For example, the input/output device 30 may display a screen via which any number can be entered, and a user may specify a range of the CB value by entering a desired number. Note that the user may select one group or a plurality of groups.

The screen G23 is a screen for specifying a period. The screen G23 is a screen for selecting one of "hours", "days", "weeks", "months", and "years", and for specifying a numerical value (0, 1, 2, . . . ). On the screen G23, when an operation to specify a period (group) is carried out, the input/output device 30 transmits, to the display device 10, specified information indicating the group specified by the user. The method of specifying the period is not limited to the method using the screen G23. For example, the input/output device 30 may display an image of a calendar, and a user may carry out an operation to select a period in the calendar which is displayed.

Note that the screen for specifying groups corresponding to molding conditions is not limited to the screens G21 to G23 illustrated in FIG. 11. For example, it is possible to employ a configuration in which a plurality of items are displayed in a pull-down list, and a user may select one of the plurality of items thus displayed.

Upon receiving the specified information from the input/output device 30, the display device 10 causes the display 31 to display one or more heat map images corresponding to one or more groups specified by the user, in accordance with the specified information thus received. The molding condition(s) of each of the molds 2 is/are obtained from the line controller 50, as in the above-described Example operation 1.

In a case where the molding condition selected by the user is the one illustrated in FIG. 11, the display device 10 classifies the molds 2 stored in the inspection result table into a plurality of groups by the CB value. The display device 10 generates a heat map image showing a spatial distribution of defect occurrence frequencies from inspection results of a plurality of molds 2 in the group having a CB value in a range of 37% to 43%. The step of generating the heat map image is the same as that in the above-described Embodiment 1. Data representing the heat map image thus generated is accumulated in the auxiliary memory 103 in response to an operation by the user. The data of the heat map image accumulated in the auxiliary memory 103 is read out at the time desired by the user, and displayed on the display 31.

As described above, the display device 10 generates image data representing one or more heat map images corresponding to one or more groups selected by a user, on the basis of the group(s) corresponding to a molding condition(s) selected by the user. The display device 10 transmits, to the input/output device 30, the image data generated. The input/output device 30 receives the image data from the display device 10, and causes the display 31 to display the one or more heat map images represented by the image data thus received.

Example Operation 3

Figure 12:
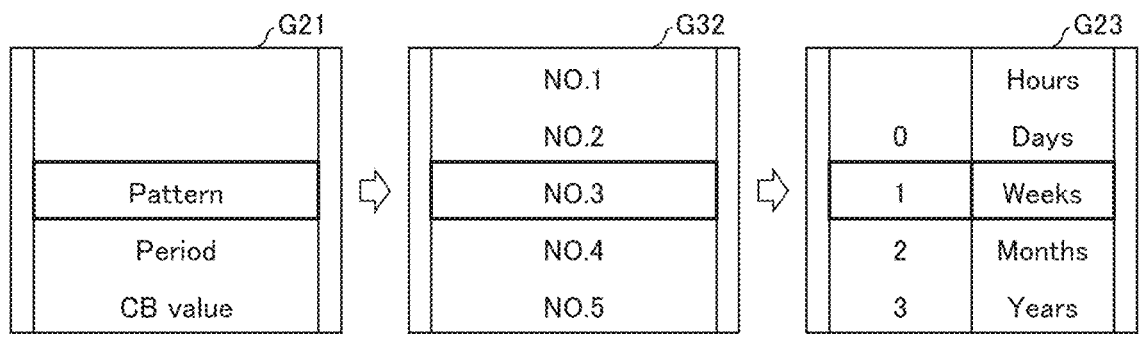
FIG. 12 is a diagram illustrating an example of screen transition for selecting a molding condition.

FIG. 12 is a diagram illustrating another example of screen transition for selecting groups corresponding to molding conditions. First, the input/output device 30 causes the display 31 to display a screen G21 in response to an operation by a user. The screen G21 is a screen obtained by scrolling the screen G21 of FIG. 11. When the user selects "pattern" on the screen G21 of FIG. 12, the input/output device 30 causes transition of a display of the display 31 to a screen G32.

The screen G32 is a screen for specifying a pattern type. The screen G32 is a screen for specifying a pattern type (group) such as "NO. 1", "NO. 2", "NO. 3", "NO. 4", "NO. 5", and the like. When a user selects "NO. 3" on the screen G32, the input/output device 30 causes transition of a display of the display 31 to a screen G23. A method of specifying the pattern type is not limited to the method using the screen G32. For example, the input/output device 30 may display a screen via which any number can be entered, and a user may specify a pattern type by entering a desired number.

The screen G23 is a screen for specifying a period, and is the same as the screen G23 of FIG. 11. In G23 of FIG. 12, when an operation to specify a period (group) is carried out, the input/output device 30 transmits, to the display device 10, specified information indicating the group specified by the user.

Upon receiving the specified information from the input/output device 30, the display device 10 causes the display 31 to display one or more heat map images corresponding to one or more groups specified by the user, in accordance with the specified information thus received. The molding conditions of each mold 2 are obtained from the line controller 50, as in the above-described Example operation 1.

In a case where a molding condition selected by the user is the one illustrated in FIG. 12, the display device 10 classifies the molds 2 stored in the inspection result table into a plurality of groups according to patterns. The display device 10 generates a heat map image showing a spatial distribution of defect occurrence frequencies from inspection results of a plurality of molds 2 in the group having the pattern type "NO. 3". The display device 10 transmits, to the input/output device 30, the image data generated. The input/output device 30 receives the image data from the display device 10, and displays, on the display 31, the heat map image represented by the image received.

Example Operation 4

Figure 13:
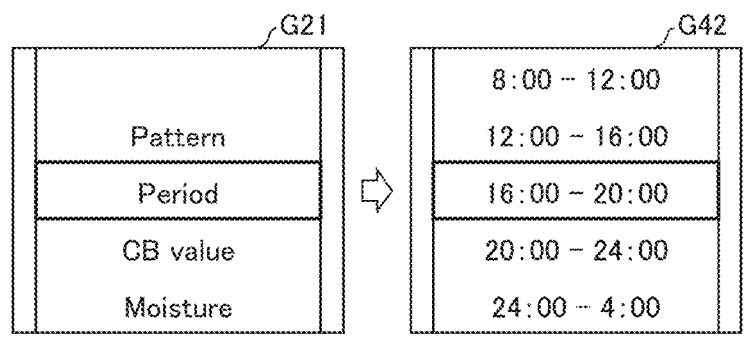
FIG. 13 is a diagram illustrating an example of a screen which is displayed on a display.

FIG. 13 is a diagram illustrating another example of screen transition for selecting a group corresponding to a molding condition. First, the input/output device 30 causes the display 31 to display a screen G21 in response to an operation by a user. The screen G21 is a screen obtained by scrolling the screen G21 of FIG. 11. When the user selects "period" on the screen G21, the input/output device 30 causes transition of a display of the display 31 to a screen G42.

The screen G42 is a screen for specifying a period (group). The screen G42 includes a screen including items for specifying a period (group) such as "8:00-12:00", "12:00-16:00", "16:00-20:00", "20:00-24:00", and "24:00-4:00". When a user selects "16:00-20:00" on the screen G42, the input/output device 30 causes transition of a display of the display 31 to a screen G23. A method of specifying the period is not limited to the method using the screen G42. For example, the input/output device 30 may display a screen via which any number can be entered, and a user may specify a period of time by entering a desired number.

Upon receiving specified information from the input/output device 30, the display device 10 causes the display 31 to display one or more heat map images corresponding to one or more groups specified by the user, in accordance with the specified information thus received. In a case where a group corresponding to the molding condition selected by the user is the one illustrated in FIG. 13, the display device 10 classifies the molds 2 stored in the inspection result table into a plurality of groups by the date and time of inspection. The display device 10 generates a heat map image showing a spatial distribution of defect occurrence frequencies from inspection results of a plurality of molds 2 in the group of the date and time of inspection "16:00-20:00".

The display device 10 transmits, to the input/output device 30, image data thus generated. The input/output device 30 receives the image data from the display device 10, and displays, on the display 31, the heat map image represented by the image received.

According to Embodiment 2, it is possible to visualize a correlation between defects which are present in the molds 2 and a molding condition. This makes it easy for a user to perceive a tendency of the defects which are present in the molds 2. For example, a heat map image for each of cases where the quality of a product is influenced or not influenced is displayed. This makes it easier to prioritize measures against defects of the molds 2. This consequently makes it easy for the user to efficiently take measures against defects of the molds 2.

Further, in Embodiment 2, a plurality of heat map images are displayed on a single screen. This allows a user to compare the plurality of heat map images with each other, so that the user can easily perceive a tendency of occurrence of defects for each molding condition. On the other hand, when a plurality of heat map images are superimposed on top of each other and displayed, the user can easily recognize the content of the heat map images by making at least a portion of the plurality of heat map images translucent.

Further, in Embodiment 2, animation display of the heat map images of respective groups is performed. This makes it possible to visualize changes (for example, changes over time) in tendency of defects of the molds 2. This makes it easier for a user to analyze a cause of the defects in more detail. In addition, the user can easily identify the cause of the occurrence of defects by viewing an animation display for each molding condition and comparing changes in tendency of occurrence of defects with regard to a plurality of parameters.

[Variation 1]

Figure 14:
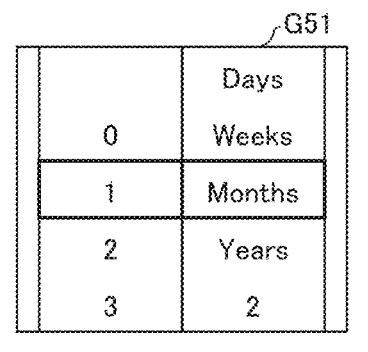

In the example operation 1 of Embodiment 2 described above, the user sets the unit period of the animation display by using the display element b16, and caused animation display of heat map images corresponding to thus set unit periods, respectively, to be performed. A method of setting the display conditions related to the animation display is not limited to the one described in the above embodiment. For example, the user may set the unit period of the animation display on the screen G42 of FIG. 13. In addition, the user may further specify an entire period for the animation display via a screen G51 illustrated in FIG. 14. The user selects the entire period (e.g., most recent "one month") of which the heat map images are to be displayed, by using the screen G51. The display device 10 performs animation display by switching in order the heat map images which are contained in the period selected and which correspond to respective unit periods, in accordance with the selection of the user. Specifically, for example, the display device 10 causes weekly heat map images for the period of one month to be displayed by switching the heat map images in order.

Embodiment 3

The following will discuss another embodiment. Embodiment 3 differs from Embodiment 1 in the content of a classification step which is carried out by a classifying section 12. In Embodiment 3, a display device 10 performs animation display by switching heat map images corresponding to a plurality of groups, respectively, in order in a heat map image display process.

The plurality of groups are groups (classifications) based on a molding condition. For example, the classifications are based on, for example, inspection periods, CB values, or squeeze pressures. In the case where molds 2 are classified by BC values, the molds 2 are classified, for example, into five groups having CB values of "0% to 29%", "30% to 36%", "37% to 43%", "44% to 50%" and "51% or higher", respectively. The display device 10 generates heat map images for the five groups, respectively. The display device 10 causes animation display of the five heat map images thus generated to be performed by switching the heat map images in order. For example, the display device 10 switches, every unit time, the heat map images to be displayed in the order of a heat map image with a CB value of "0% to 29%", a heat map image with a CB value of "30% to 36%", a heat map image with a CB value of "37% to 43%", a heat map image with a CB value of "44% to 50%", and a heat map image with a CB value of "51% or higher".

As another example, for example, in a case where a plurality of molds 2 are classified into a plurality of groups by squeeze pressures, the display device 10 classifies the plurality of molds 2 into the plurality of groups and generates respective heat map images for the plurality of groups. The display device 10 performs animation display of the plurality of heat map images thus generated, by switching these heat map images in order.

According to Embodiment 3, it is possible to visualize changes in tendency of defects of the molds 2. For example, how the tendency of defects changes as the CB value increases is represented by an animated image displayed on a display 31. Such an animation display of the heat map images for respective groups each corresponding to a molding condition is viewed by a user, and the user checks changes in tendency of occurrence of defects for a plurality of molding conditions. This makes it easier for the user to identify causes of the defects.

[Software Implementation Example]

Control blocks of the display device 10 (particularly, the defect inspecting section 11, the classifying section 12, the generating section 13 and the display section 14) can be realized by a logic circuit (hardware) provided in an integrated circuit (IC chip) or the like or can be alternatively realized by software.

In the latter case, the display device 10 includes a computer that executes instructions of a program that is software realizing the foregoing functions. The computer, for example, includes one or more processors and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" including not only a read only memory (ROM) etc. but also a tape, a disk, a card, a semiconductor memory, and a programmable logic circuit. The computer may further include a random access memory (RAM) or the like in which the program is loaded. The program can be supplied to or made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

[Supplementary Note]

The present invention is not limited to the above embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

In order to solve the above problem, an inspection result display device in accordance with Aspect 1 of the present invention is an inspection result display device of which inspection target objects are a plurality of molds or a plurality of patterns, the inspection result display device comprising: a controller, the controller being configured to carry out the steps of: (i) classifying the inspection target objects into a plurality of groups; (ii) generating, for each of the plurality of groups, a heat map image from a result of defect inspection of one or more of inspection target objects which are classified into the each of the plurality of groups, the heat map image representing a spatial distribution of defect occurrence frequencies; and (iii) causing a display to display one or more of the heat map images generated in the step (ii), the one or more heat map images corresponding to one or more groups specified by a user from among the plurality of groups.

In the above configuration, the inspection result display device classifies, into a plurality of groups, a plurality of molds or a plurality of patterns, which are inspection target objects. Further, the inspection result display device causes a display to display one or more heat map images corresponding to one or more groups specified by a user. Therefore, it is easy for the user as an operator to perceive a tendency of defects which are present in the inspection target objects.

An inspection result display device in accordance with Aspect 2 of the present invention may be configured such that in Aspect 1 described above, the inspection target objects are the plurality of molds.

In the above configuration, the inspection result display device classifies molds into a plurality of groups, and causes a display to display one or more heat map images corresponding to one or more groups specified by a user. Therefore, it is easy for the user to perceive a tendency of defects which are present in the molds.

An inspection result display device in accordance with Aspect 3 of the present invention may be configured such that in Aspect 2 described above, in the step (i), the controller classifies each of the plurality of molds by a pattern used in forming the each of the plurality of molds.

In the above configuration, the inspection result display device classifies, into a plurality of groups, molds by patterns used in forming the molds, and causes a display to display one or more heat map images corresponding to one or more groups specified by a user. Therefore, it is easy for the user to perceive a tendency of defects of molds for each pattern.

An inspection result display device in accordance with Aspect 4 of the present invention may be configured such that in Aspects 2 or 3 described above, in the step (i), the controller classifies each of the plurality of molds by a unit period in which the each of the plurality of molds is inspected.

In the above configuration, the inspection result display device classifies, into a plurality of groups, molds by unit periods in which the molds are inspected, and causes a display to display one or more heat map images corresponding to one or more groups specified by a user. Therefore, it is easy for the user to perceive a tendency of defects of the molds and changes in tendency of defects of the molds.

An inspection result display device in accordance with Aspect 5 of the present invention may be configured such that in any one of Aspects 2 to 4 described above, in the step (i), the controller classifies each of the plurality of molds by at least one of (a) a molding condition in formation of the each of the plurality of molds and (b) the result of the defect inspection of the each of the plurality of molds.

In the above configuration, the inspection result display device classifies, into a plurality of groups, molds by at least one of (a) molding conditions in formation of the molds and (b) results of the defect inspection of the molds, and causes a display to display one or more heat map images corresponding to one or more groups specified by a user. Therefore, it is easy for the user to perceive a tendency of defects for each molding condition and/or for each result of defect inspection.

An inspection result display device in accordance with Aspect 6 of the present invention may be configured such that in Aspect 5 described above, the molding condition includes at least one of (a) a sand property of the each of the plurality of molds, (b) a control parameter of a molding machine which produces the each of the plurality of molds, (c) a meteorological condition, and (d) the degree of defect severity.

In the above configuration, the inspection result display device classifies, into a plurality of groups, molds by a molding condition including at least one of (a) sand properties of the molds, (b) control parameters of a molding machine which produces the molds, (c) meteorological conditions, and (d) degrees of defect severity. The inspection result display device then causes a display to display one or more heat map images corresponding to one or more groups specified by a user. Therefore, it is easy for the user to perceive, for each molding condition, a tendency of defects which are present in the molds.

An inspection result display device in accordance with Aspect 7 of the present invention may be configured such that in Aspect 5 or 6 described above, the result of the defect inspection includes the degree of defect severity.

In the above configuration, the inspection result display device classifies, into a plurality of groups, molds by degrees of defect severity, and causes a display to display one or more heat map images corresponding to one or more groups specified by a user. Therefore, it is easy for the user to perceive, for each degree of defect severity, a tendency of defects which are present in the molds.

An inspection result display device in accordance with Aspect 8 of the present invention may be configured such that in any one of Aspects 2 to 7 described above, in the step (i), the controller classifies each of the plurality of molds by whether the each of the plurality of molds is a cope or a drag.

In the above configuration, the inspection result display device classifies, into a plurality of groups, molds by whether the molds are each a cope or a drag, and causes a display to display one or more heat map images corresponding to one or more groups specified by a user. Therefore, it is easy for the user to perceive a tendency of defects for cases where molds are copes and a tendency of defects for cases where molds are drags.

An inspection result display device in accordance with Aspect 9 of the present invention may be configured such that in any one of Aspects 1 to 8 described above, in the step (iii), the controller causes the display to perform animation display of the heat map images corresponding to the plurality of groups, respectively, by causing the display to display the heat map images in order.

In the above configuration, the inspection result display device causes a display to display a plurality of heat map images in the order appropriate for a molding condition. Therefore, it is easy for the user to perceive a tendency of defects associated with the molding condition and changes in tendency of defects associated with the molding condition.

An inspection result display device in accordance with Aspect 10 of the present invention may be configured such that in Aspect 1 described above, the inspection target objects are the plurality of patterns.

In the above configuration, the inspection result display device classifies patterns into a plurality of groups, and causes a display to display one or more heat map images corresponding to one or more groups specified by a user. Therefore, it is easy for the user to perceive a tendency of defects which are present in the patterns.

An inspection result display device in accordance with Aspect 11 of the present invention may be configured such that in any one of Aspects 1 to 10 described above, the controller includes: at least one processor configured to carry out each of the foregoing steps in accordance with a predetermined program; and at least one memory storing the program.

In the above configuration, the inspection result display device classifies, into a plurality of groups, molds or patterns, which are inspection target objects. Further, the inspection result display device causes a display to display one or more heat map images corresponding to one or more groups specified by a user. Therefore, it is easy for the user to perceive a tendency of defects which are present in the inspection target object.

A computer-readable non-transitory storage medium in accordance with Aspect 12 of the prevent invention stores a control program for controlling an inspection result display device described in Aspect 1 described above, the control program causing the controller to carry out each of the foregoing steps.

The scope of the present invention encompasses a control program for controlling the inspection result display device in accordance with Aspect 1 described above, and a computer-readable non-transitory storage medium storing the control program.

REFERENCE SIGNS LIST 1 casting system
2 mold
10 display device
11 defect inspecting section
12 classifying section
13 generating section
14 display section
20 inspecting device
30 input/output device
31 display
40 molding machine
50 line controller
60 pouring machine
70 conveying device 101 processor
102 main memory
103 auxiliary memory
104 input interface
105 output interface

The invention claimed is:

1. An inspection result display device of which inspection target objects are a plurality of molds or a plurality of patterns for producing the molds, the inspection result display device comprising:
a controller,
the controller being configured to carry out
a step (i) of classifying the inspection target objects into a plurality of groups;
a step (ii) of generating, for each of the plurality of groups, a heat map image representing a spatial distribution of defect occurrence frequencies from a result of a defect inspection of one or more the inspection target objects classified into one or more of the plurality of group; and
a step (iii) of causing a display to display one or more of the heat map images generated in the step (ii) for each of the plurality of groups, the one or more of the heat map images corresponding to one or more groups specified by a user from among the plurality of groups.

2. The inspection result display device according to claim 1, wherein the inspection target objects are the plurality of molds.

3. The inspection result display device according to claim 2, wherein in the step (i), the controller classifies each of the plurality of molds based on a pattern used in forming the each of the plurality of molds.

4. The inspection result display device according to claim 2, wherein, in the step (i), the controller is configured to classify each of the plurality of molds by a unit period in which the each of the plurality of molds is inspected, wherein the unit period is a unit for classifying inspection periods of the molds into the plurality of groups.

5. The inspection result display device according to claim 2, wherein, in the step (i), the controller is configured to classify each of the plurality of molds based on at least one of (a) a molding condition associated with formation of the each of the plurality of molds or (b) the result of the defect inspection of the each of the plurality of molds.

6. The inspection result display device according to claim 5, wherein the molding condition includes at least one of (a) a sand property of the each of the plurality of molds, (b) a control parameter of a molding machine which produces the each of the plurality of molds, or (c) a meteorological condition, the meteorological condition inducting at least one of a temperature or a humidity.

7. The inspection result display device according to claim 5, wherein the result of the defect inspection includes a degree of defect severity.

8. The inspection result display device according to claim 2, wherein, in the step (i), the controller is configured to classify each of the plurality of molds based on whether the each of the plurality of molds is a cope or a drag.

9. The inspection result display device according to claim 1, wherein, in the step (iii), the controller is configured to cause the display to perform an animation display of the heat map images corresponding to the plurality of groups, respectively, to display the heat map images in order.

10. The inspection result display device according to claim 1, wherein the inspection target objects are the plurality of patterns.

11. The inspection result display device according to claim 1, wherein the controller comprises:
at least one processor configured to carry out each of the step (i), the step (ii), and the step (iii) in accordance with a program; and
at least one memory storing the program.

12. A computer-readable non-transitory storage medium storing a control program for controlling the inspection result display device according to claim 1 that, when executed by one or more processors, is configured to cause the controller to carry out the step (i), the step (ii), and the step (iii).

* * * * *